United States Patent [19]

McKenna, Jr. et al.

[11] 4,234,660
[45] Nov. 18, 1980

[54] PRESSURE SENSITIVE ADHESIVE COMPOSITIONS CONTAINING A POLYMETALOXANE AND ARTICLE

[75] Inventors: Lawrence W. McKenna, Jr., Wilbraham; Ronald S. Finkelstein, Longmeadow; John K. Haynes, Jr., Springfield, all of Mass.

[73] Assignee: Monsanto Company, St. Louis, Mo.

[21] Appl. No.: 76,008

[22] Filed: Sep. 17, 1979

Related U.S. Application Data

[62] Division of Ser. No. 863,113, Dec. 22, 1977, Pat. No. 4,185,051.

[51] Int. Cl.³ .................. B32B 27/08; B32B 27/30; B32B 27/32; B32B 27/36
[52] U.S. Cl. .................................. 428/411; 428/483; 428/516; 525/370; 525/329

[58] Field of Search ............... 525/370, 329; 428/483, 428/516, 411

[56] References Cited

U.S. PATENT DOCUMENTS

| | | | |
|---|---|---|---|
| 3,532,708 | 10/1970 | Blance | 260/31.2 |
| 3,769,254 | 10/1973 | Anderson et al. | 260/33.4 PQ |
| 4,005,247 | 1/1977 | Graham | 526/15 |

*Primary Examiner*—Carman J. Seccuro
*Attorney, Agent, or Firm*—R. Bruce Blance; William J. Farrington; Edward P. Grattan

[57] ABSTRACT

Pressure sensitive adhesives having improved color, cohesive strength and tack (are) obtained by reacting an acrylic interpolymer containing hydroxyl or carboxyl groups with a poly(metaloxane), poly(alkoxytitanoxanes) being particularly preferred.

17 Claims, No Drawings

PRESSURE SENSITIVE ADHESIVE COMPOSITIONS CONTAINING A POLYMETALOXANE AND ARTICLE

This is a division, of application Ser. No. 863,113, filed Dec. 22, 1977 now U.S. Pat. No. 4,185,051.

BACKGROUND OF THE INVENTION

The present invention relates to acrylic polymer compositions which are capable of rapid cure to highly tacky, creep resistant pressure sensitive adhesives and to articles of manufacture comprising films of such pressure sensitive resins. In another aspect, the invention relates to a process of manufacture of such articles. More particularly, it pertains to acrylic pressure sensitive resins and articles manufactured therefrom, containing polytitanoxanes or polyzirconoxanes.

Pressure-sensitive resins are used conventionally in the form of films to provide adhesive bonds between normally non-adhering superstrates and substrates. The films may be prepared by casting them from organic solvent solutions and evaporating the solvent. In order to increase the cohesive strength and improve the creep resistance and holding power of the dried film, metal alkoxides such as tetrabutyltitanate (U.S. Pat. No. 3,532,708) and chelated metal alkoxides (U.S. Pat. Nos. 3,769,254 and 3,886,126) may be incorporated into the solvent solutions. Upon drying, crosslinked films result by interaction of the metal alkoxide with functional groups of the pressure sensitive resin such as carboxyl or hydroxyl groups.

The solutions allow cure of the resins merely by evaporation of the solvent. Of particular interest have been tetraalkyl titanates and titanium chelates which are formulated with hydroxyl or acid containing acrylic pressure-sensitive resins in alcohol solutions to yield stable solutions from which crosslinked pressure-sensitive resins are obtained by evaporation of the alcoholic solvent. However, such titanates can cause in pressure sensitive resins a loss in tack and can impart to dried films of the resins a yellow color which minimizes the suitability of such films for use on transparent or translucent substrates. The undesirable loss in tack of the dried films is manifested by a decrease in the agressiveness or ease with which adhesive films form bonds when they are applied to substrates. The undesirable yellow coloration creates an aesthetic problem which inhibits or prevents the use of these pressure sensitive systems in polyester or polyethylene laminates and in medical tapes.

SUMMARY OF THE INVENTION

The present invention provides pressure-sensitive resin systems which possess little or no color and exhibit improved cohesive strength without loss of tack. The pressure-sensitive resin compositions comprise:
1. an interpolymer having a weight average molecular weight in the range of about 10,000 to about 500,000 and a glass transition temperature in the range of about $-15°$ C. to about $-75°$ C., the interpolymer comprising:
   a. from about 0.5 to about 20 weight percent of at least one monomer containing a hydroxyl or carboxyl group,
   b. at least one acrylic ester containing from six to 20 carbon atoms, and
   c. optionally, one or more ethylenically unsaturated monomers selected from the group consisting of α-olefins containing from two to 10 carbon atoms, vinyl esters of alkanoic acids containing from three to 10 carbon atoms, ethyl, methyl and propyl acrylates, methacrylates containing from 3 to 20 carbon atoms, acrylonitrile, methacrylonitrile, styrene, α-methyl styrene, vinyl chloride and diesters of unsaturated dicarboxylic acids such as maleic acid, fumaric acid and itaconic acid containing from 6 to 20 carbon atoms, and
2. at least one polymetaloxane containing on average from 2 to 20 metal atoms in the chain, in which the metal atoms are selected from the group consisting of titanium and zirconium and which is the formal product of hydrolysis of the corresponding monomeric metal tetra-alkoxide, wherein the radical R of the alkoxide group is selected from the group consisting of aliphatic, substituted aliphatic, alicyclic and substituted alicyclic radicals containing from 2 to 10 carbon atoms and wherein the polymetaloxane is present in an amount sufficient to improve the cohesive strength of the dry pressure sensitive resin composition.

Other aspects of the invention are directed to organic solvent solutions of the pressure-sensitive resins, to articles of manufacture such as tapes, sheets and films coated with the pressure sensitive resins and to a process of manufacture of such articles by applying the films of the pressure sensitive resins to suitable substrates.

DESCRIPTION OF THE INVENTION

The pressure sensitive resins of the invention comprise an acrylic interpolymer and a poly(metaloxane).

The interpolymer comprises monomers selected from the groups a, b and c as set forth in the summary of invention. Group a monomers contain hydroxyl or carboxyl groups. Monomers containing hydroxyl groups are exemplified by hydroxyalkyl acrylates, hydroxyalkyl methacrylates, hydroxylalkyl fumarates and hydroxyalkyl maleates wherein the alkyl group contains from two to four carbon atoms. Preferred hydroxy monomers include 2-hydroxyethyl acrylate and methacrylate, 2-hydroxypropyl acrylate and methacrylate and 3-hydroxypropyl acrylate and methacrylate bis(2-hydroxyethyl)fumarate and bis(2-hydroxyethyl)maleate. Monomers containing or generating carboxyl groups are exemplied by acrylic acid, methacrylic acid, crotonic acid, isocrotonic acid, and the like, maleic anhydride, maleic acid, fumaric acid, citraconic acid, itaconic acid, and the like, and the alkyl monoesters of maleic acid, fumaric acid, citraconic acid and itaconic acid in which the alkyl group contains from one to eight carbon atoms such as methyl, ethyl, propyl, butyl and octyl maleates and the like which may optionally be generated in situ by reaction of the appropriate alcohol with maleic anhydride units in the interpolymer. Preferred acid monomers include acrylic acid and methacrylic acid. The amount of group a monomer in the interpolymer is generally in the range of about 0.5 to about 20 weight percent of the interpolymer, and is preferably in the range of about 1 to about 10 percent for adequate crosslinking potential without excessive solution viscosity.

Group b monomers include the acrylic esters containing from six to 20 carbon atoms. Preferred esters have an average of 6 to 12 carbon atoms and more preferably are acrylic esters of branched chain aliphatic alcohols such as isobutyl acrylate, 2-ethylbutyl acrylate and 2-ethylhexyl acrylate.

The pressure-sensitive resin need only contain monomers from groups a and b. However, optionally, monomers from group c may also be present. Group c includes α-olefins containing from two to 10 carbon atoms, vinyl esters of alkanoic acid containing three to 10 carbon atoms such as vinyl acetate and vinyl octoate, ethyl, methyl, and propyl acrylates, methacrylates containing from 3 to 20 carbon atoms, acrylonitrile, methacrylonitrile, styrene α-methyl styrene, vinyl chloride and diesters of unsaturated dicarboxylic acids such as maleic, fumaric, citraconic and itaconic acid containing from 6 to 20 carbon atoms.

The preferred Group c monomers include vinyl acetate, ethyl, methyl and propyl acrylates, and methacrylates containing from 3 to 10 carbon atoms.

It will be recognized that the ratio of monomers in the interpolymer will be selected to provide an amorphous normally tacky pressure-sensitive resin. In most cases it will be necessary to have at least about 40 percent by weight of the interpolymer consist of group b monomers. Generally, the ratio of monomers in the interpolymer is selected so that the interpolymer possesses a glass transition temperature in the range of about $-15°$ to about $-75°$ C. A suitable ratio is conventionally calculated from the equation:

$$(1/T_g) = (W_1/T_{g1}) + (W_2/T_{g2}) + \ldots + (W_n/T_{gn})$$

where $T_g$ is the glass transition temperature of the interpolymer expressed in degrees Kelvin, $T_{g1}$, $T_{g2}$, etc. are the glass transition temperatures of the homopolymers of the respective comonomers and $W_1$, $W_2$, etc. are the weight fractions of comonomers required for a specific glass transition temperature of the interpolymer. A suitable source for glass transition temperatures of the homopolymers is the Polymer Handbook, Second Edition, Edited by J. Brandrup and E. H. Immergut, John Wiley and Sons, New York, 1975, Chapter III, 143–179.

Glass transition temperatures are determined experimentally by means of the duPont Differential Thermal Analyzer at a heating rate of 20° K. per minute, the Tg being taken as the mid-point of the discontinuity in the differential temperature curve.

The weight molecular weight of the interpolymer is generally in the range of about 10,000 to about 500,000, corresponding to a relative viscosity in the range of 1.3 to 8.0 measured on a solution of 2 grams of interpolymer per deciliter of ethyl acetate. The preferred molecular weight range is from about 20,000 to about 300,000, providing adequate cohesive strength to the interpolymer without excessive solution viscosity.

The interpolymers can be prepared by any convenient method. For example they may be prepared by aqueous emulsion polymerization and recovered from the emulsion. However, since the poly(metaloxane) is added in organic solvent solution, it is more convenient to prepare the interpolymers by organic solvent polymerization techniques involving in some cases delayed addition of monomer when there is a great disparity between reactivity ratios as for example between the reactivity ratios of vinyl acetate and acrylate monomers. The time interval for the delayed addition may range from about 60 to about 600 minutes and longer. The techniques in general, involve the polymerization of the respective monomer mixtures in suitable organic solvents, the polymerization being initiated by heat activated free radical initiators. The choice of solvents for solution polymerization is governed by the solubility requirements of the monomers and the resulting interpolymers in that both the monomers and the resulting interpolymers should be soluble in the selected solvent or mixtures of solvents.

Examples of suitable solvents for the interpolymers include aromatic solvents such as benzene, toluene, xylene, etc. Suitable aliphatic solvents include esters such as ethyl acetate, propyl acetate, isopropyl acetate, butyl acetate, etc.; ketones such as methyl ethyl ketone, acetone, etc.; aliphatic hydrocarbons such as hexane, heptane, etc. Especially useful are mixtures of the foregoing.

Polymerization initiators suitable for the preparation of the special interpolymers of this invention include organic peroxides, such as tert-butyl hydroperoxide, di-tert-butylperoxide, cumene hydroperoxide, di-cumyl peroxide, benzoyl peroxide and the like. Equally suitable are organic peroxygen compounds such as tert-butyl peracetate, acetate, tert-butyl perbenzoate, di-tert-butyl perphthalate and azo compounds such as $\alpha,\alpha'$-azo-diisobutyronitrile. The choice of iniator depends on the temperature of polymerization and is readily selected by the practitioner skilled in the art.

The following Examples illustrate the preparation formulation and testing of the special interpolymers which are to be used in the practice of this invention and are not to be construed as limitations thereof. All parts and percentages are by weight unless otherwise specified and the expressions polymer and interpolymer are used interchangeably.

PREPARATION OF INTERPOLYMERS

EXAMPLE 1

This Example illustrates the preparation of an interpolymer comprising 50.5 parts 2-ethylhexyl acrylate, 45 parts methyl acrylate and 4.5 parts 2-hydroxyethyl acrylate.

The polymer is prepared under reflux conditions in a kettle equipped with a stirrer, condenser, holding tanks and pumps.

| AMOUNT OF INGREDIENTS, Parts by Weight | | | | |
|---|---|---|---|---|
| | Initial Charge | Subsequent Charge | | |
| | | 1 | 2 | 3 |
| 2-ethylhexyl acrylate | 14.1 | | 6.97 | |
| Methyl acrylate | 12.6 | | 6.20 | |
| 2-hydroxyethyl acrylate | 1.26 | | 0.62 | |
| Ethyl acetate | 19.69 | 12.3 | | 9.0 |
| Hexane | 5.14 | | 2.74 | 9.26 |
| α,α-azo-diisobutyronitrile | 0.076 | 0.038 | | |
| Dodecyl mercaptan | 0.0027 | 0.0013 | | |

Charges 1 to 2 are made at uniform rates over the 1¼ hour period after the initial charge reaches reflux. After 6½ hours of reflux, the batch is cooled and charge 3 is added. The solids content is 41.0 percent. The Brookfield viscosity is 3,000 cps. The relative viscosity, determined with a solution of 2 grams of resin in 100 ml. ethyl acetate is 4.1.

EXAMPLES 2 to 13

The general procedure of Example 1 is followed except that different monomers and monomer ratios are used in order to illustrate a variety of interpolymers used in the practice of this invention.

TABLE 1
COMPOSITIONS OF INTERPOLYMERS PREPARED IN EXAMPLES 1 to 13

| Ex. | Monomeric Components | Weight Ratio |
|---|---|---|
| 1 | EHA/MA/HEA | 50.5/45/4.5 |
| 2 | EHA/VAc/HEA | 67/28/5 |
| 3 | EHA/VAc/AA | 59/39.5/1.5 |
| 4 | EHA/VAc/AA | 52/47/1.0 |
| 5 | EHA/VAc/AA | 65/32.5/2.5 |
| 6 | EHA/MA/AA | 61/33/6.2 |
| 7 | EHA/MA/HEA | 71/24/5 |
| 8 | iBA/MA/HEA | 71/24/5 |
| 9 | VAc/EHA/HPA | 45/50/5 |
| 10 | VAc/EHA/HEMA | 35/60/5 |
| 11 | VAc/EHA/HEF | 40/55/5 |
| 12 | AN/EHA/HEMA | 25/70/5 |
| 13 | VCl/EHA/HEMA | 30/65/5 |

LEGEND
EHA 2-ethylhexyl acrylate
MA methyl acrylate
HEA 2-hydroxyethylacrylate
VAc vinyl acetate
AA acrylic acid
HPA 3-hydroxypropyl acrylate
HEMA 2-hydroxyethyl methacrylate
HEF bis(2-hydroxyethyl)fumarate
AN acrylonitrile
VCl vinyl chloride
iBA isobutyl acrylate

TABLE 2
SOLUTION PROPERTIES OF INTERPOLYMERS EXAMPLES 1 to 13

| EX. | Ethyl Acetate | Toluene | Hexane | iPrOH | EtOH | Solids, % | Viscosity, cps. | Relative Viscosity |
|---|---|---|---|---|---|---|---|---|
| 1 | 70 | — | 30 | — | — | 41 | 3,000 | 4.1 |
| 2 | 81 | 19 | — | — | — | 40 | 3,700 | 4.0 |
| 3 | 50 | — | 50 | — | — | 50 | 15,000 | 2.3 |
| 4 | 10 | 19 | 71 | — | — | 56 | 30,000 | 2.9 |
| 5 | 60 | — | 40 | — | — | 47 | 18,000 | 4.7 |
| 6 | 75 | — | 15 | 10 | — | 39 | 15,000 | 4.3 |
| 7 | 70 | — | 20 | 10 | — | 41 | 5,200 | 3.7 |
| 8 | 60 | 20 | — | — | 20 | 41 | 12,000 | — |
| 9 | 74 | — | 18 | — | 8 | 42 | 8,800 | — |
| 10 | 74 | — | — | — | 26 | 40 | 8,500 | — |
| 11 | 74 | — | — | — | 26 | 43 | 9,200 | — |
| 12 | 20 | 80 | — | — | — | 37 | — | — |
| 13 | 100 | — | — | — | — | 41 | — | — |

FORMULATION OF RESIN SOLUTIONS WITH POLY(METALOXANES) AND EVALUTION OR PRESSURE SENSITIVE RESINS

After the preparation of the interpolymer solution in organic solvent, the solution is formulated with at least one polymetaloxane in which the metal atoms are selected from the group consisting of titanium and zirconium, the polymetaloxane being the formal product of limited hydrolysis of the corresponding metal tetraalkoxide and containing on average from 2 to 20 metal atoms in the chain. The radical R of the alkoxide group of the metal alkoxide is selected from the group consisting of aliphatic, substituted aliphatic, alicyclic and substituted alicyclic radicals containing from 2 to 10 carbon atoms. In the preferred polytitanoxanes, R is preferably a lower linear aliphatic radical containing on average from 3 to 6 carbon atoms such as n-propyl, n-butyl or n-hexyl and the number of titanium atoms per molecule of polytitanoxane is on average from 3 to 10. The polytitoxanes and polyzirconoxanes are prepared from the corresponding titanium and zirconium alkoxide by methods described in the prior art and there is therefore no intention to limit them to the actual hydrolysis products of metal tetraalkoxides. For example they can be prepared by reacting n moles of the parent alkoxide with n-1/2 moles of acetic anhydride and can be represented by the following general formula:

$$[M_n O_{n-1}][OR]_{2n+2}$$

wherein $M = Ti$ or $Zr$, and $n$ is an integer in the range of from 2 to 20.

The amount of polytitanoxane or polyzirconoxane used with a given resin can be readily selected to provide the desired degree of cross-linking and enhancement in cohesive strength of the resin after it has been cast from solution. The amount will depend on the type and amount of reactive group (hydroxyl or carboxyl) present in the interpolymer, the molecular weight of the interpolymer and the concentration of interpolymer in the organic solvent solution. When the concentration of carboxyl or hydroxyl group is high or the molecular weight of the interpolymer is large, the amount of polytitanoxane or polyzirconoxane necessary to enhance the cohesive strength of the interpolymer to a satisfactory level can be quite small. Conversely, when the concentration of carboxyl or hydroxyl group is low or the molecular weight of the interpolymer is small, the amount of polytitanoxane or polyzirconoxane is relatively large. As little as about 0.01 parts by weight of polytitoxane or polyzirconoxane per 100 parts by weight of interpolymer can be effective while as much as about 2.0 parts by weight can be required. However, the preferred range is from about 0.05 to about 1.0 part by weight per 100 parts by weight of interpolymer.

Unlike monomeric titanium and zirconium alkoxides, the polytitanoxanes and polyzirconoxanes derived therefrom may be added to the interpolymer solutions in the absence of highly polar solvents such as the lower alcohols and much higher concentrations of resin and crosslinking agent can be achieved in the solution without excessive viscosity, or gelling. However, it may still be advantageous to include a lower alcohol in the resin solution for solution stability. Moreover, such alcohols increase the solubility parameter of the solvent, and minimize swelling of substrates which are sensitive to the less polar solvents conventionally used in the solution interpolymerization process. Apart from the lower alcohols, conventional solvents and solvent blends are selected for use in the pressure-sensitive resin solutions of this invention on the basis of solubility requirements of the resin and the nature of the substrate which is to be coated. It is preferable that as little water as possible be present since it tends to hydrolyze the poly(metaloxane). However, water up to about 3% by weight of the solution can be tolterated particularly when an alcohol is present. The solids content of the resin solutions can be varied between 10 percent and 60 percent for application to the substrate. The preferred concentration is between 20 and 50 percent.

Especially when the concentration of crosslinking agent is relatively high, better solution stability at high concentrations of interpolymer can be achieved by addition of an effective amount of a chelating agent such as a 1,2- or 1,3-glycol, e.g. ethylene glycol or 1,3-propylene glycol, a 1,2- or 1,3- dialdehyde or diketone such as glyoxal, biacetyl or acetylacetone, a keto ester such as ethyl acetoacetate ester, a hydroxy acid such as lactic, citric or tartaric acid, or an aminoalcohol such as ethanolamine, diethanolamine or triethanolamine. The chelating agent may be added directly to the interpolymer solution or it may be added first to the polytitoxane or polyzirconoxane. In general the amount of chelating agent useful for the purpose of improved solution stability is in the range of about 0.5 to about 3 weight percent of the interpolymer.

The reaction between the polytitoxane or polyzirconoxane and the acrylic interpolymer takes place upon evaporation of the solvent from the resin solution and does not require special conditions. Ordinarily, the reaction occurs during the normal coating and drying operation in the preparation of articles coated with pressure sensitive resin which is conventionally carried out at temperatures in the range of 50° to 150° C. However, even drying at room temperature can effect the crosslinking reaction.

The adhesive compositions containing polytitanoxanes or polyzirconoxanes possess cohesive strength superior to adhesive compositions containing the same concentration of titanium or zirconium alkoxides but surprisingly are in general at least as tacky and indeed frequently demonstrate superior tack in comparison with pressure sensitive resins containing no crosslinking agent.

The adhesive can be employed in various forms. For instance, it can be cast as a free film interleaved between sheets of release paper and employed in a transfer operation. In other methods of utilization, the adhesive is coated onto a backing member and dried to provide pressure-sensitive adhesive coated materials, such as tapes, sheets or panels. Alternatively, the adhesive may be coated on a release material and then dried and transferred to a backing member. Cellophane, vinyls, cloth, Mylar, rubber, various laminates, and other such flexible materials, as well as wood, metal, hardboard and other less flexible backings, can be coated in this manner. The adhesives of this invention may also be used for decorative coatings, outdoor decals, and signs. In some cases, the adhesive can be used as a liquid adhesive and applied just prior to use.

The dried adhesive compositions containing polytitoxanes and polyzirconoxanes demonstrate less color development than equivalent compositions containing alkoxides or chelated alkoxides and are therefore particularly useful in applications involving transparent or translucent substrates, for example in the preparation of polyethylene and Mylar polyester film laminates and in the preparation of medical tapes wherein the development of a yellow color is asethetically undesirable.

There can also be included in the adhesive composition additive materials which do not affect the basic properties of the adhesive. Fillers, tackifiers, antioxidants, stabilizers, and the like are thus sometimes added to the formulated adhesive.

Resin solutions for evaluation of the pressure sensitive resins are prepared by adding an ethanol solution of poly(n-butoxytitoxane) (PBT) containing 5 atoms titanium per molecule on average to provide solutions containing 30 percent solids. The solutions are cast as films on silicone release paper and the films are dried at room temperature then at 90° C. for 2 minutes to provide films of 25 microns in thickness. For comparative purposes, films of pressure sensitive resin containing diisopropoxy titanium diacetylacetonate (TAA) and titanium tetra-n-butoxide (tetrabutyl titanate, TBT) are prepared similarly. The films are evaluated for ball tack using 11.1 mm and 6.35 mm balls by the method PSTC-6 of the Pressure Sensitive Tape Council, and for peel strength and creep resistance.

In the method for determining peel strength, the pressure-sensitive resin solutions listed in Table 2 are cast on silicone release paper, and the cast films are dried at room temperature, then at 90° C. for 2 minutes. The (25 micron) films are cooled to room temperature and applied to polyethylene terephthalate film 25 micron thick. The laminate is cut into 2.54 cm. strips. The strips are conditioned at 70° F. and 50 percent relative humidity for 1 hour. The release paper is removed and the strips are applied to steel panels (ASTM 1000-65) with a PSTC 2 kilogram roller at a rate of 30 cm. per minute. Peel strength is determined on a Instron Test Machine by peeling the strip at a 180° angle and at a rate of 30 cm. per minute from the steel panel. "Green" strength is gauged by comparing the peel strength of the bond 10 minutes after formation and 24 hours after formation.

The cohesive strength of the pressure-sensitive adhesive is gauged from the creep resistance of a 1.61 square cm. 25 micron thick bond formed by the film of adhesive coated on a strip of polyethylene terephthalate film and applied to a chrome plated flat bar applied with pressure for 15 seconds from a Standard Pinch Clamp. The polyethylene terephalate strip is loaded with a 454 gram weight. The bond is held in a vertical plane at 70° F. and 50 percent relative humidity and the time in hours for failure after application of the load is determined and the mode of failure (adhesive or cohesive) is noted.

Data for resin compositions prepared from interpolymer Examples 2, 3, 5 and 6 at three concentrations of crosslinker are presented in Table 3.

TABLE 3

COMPARISON OF PRESSURE SENSITIVE RESINS

| Interpolymer | % Crosslinker | Ball Tack 11.1 mm ball cm. | Ball Tack 6.35 mm ball cm. | Peel Strength, 10 Min. Ncm$^{-1}$ | Peel Strength, 24 Hrs. Ncm$^{-1}$ | Creep Resistance 454 g load, 1.61 cm$^2$ Hrs. |
|---|---|---|---|---|---|---|
| Example 2 | Control - 0 | 2.79 | 1.57 | 5.42$^a$ | 5.94$^a$ | 0.15$^c$ |
|  | 0.1 PBT | 2.84 | 1.14 | 4.28$^a$ | 6.01$^a$ | 1.0$^c$ |
|  | 0.2 PBT | 2.68 | 0.97 | 4.24$^a$ | 5.54$^a$ | 2.56$^a$ |
|  | 0.4 PBT | 2.46 | 0.84 | 4.55$^a$ | 5.38$^a$ | 12.1$^a$ |
|  | 0.1 TAA | 3.05 | 0.84 | 4.60$^a$ | 5.38$^a$ | 0.75$^c$ |
|  | 0.2 TAA | 2.74 | 1.47 | 4.24$^a$ | 5.54$^a$ | 2.92$^c$ |
|  | 0.4 TAA | 2.24 | 1.09 | 4.46$^a$ | 6.81$^a$ | 4.9$^a$ |
|  | 0.1 TBT | 2.79 | 1.27 | 4.55$^a$ | 5.85$^a$ | 0.52$^c$ |
|  | 0.2 TBT | 2.62 | 1.88 | 4.37$^a$ | 6.21$^a$ | 2.52$^c$ |
|  | 0.4 TBT | 2.21 | 1.19 | 4.55$^a$ | 7.13$^a$ | 7.8$^a$ |
| Example 3 | Control - 0 | 7.69 | 3.35 | 4.68$^a$ | 8.30$^a$ 15.73$^c$ | 0.20$^c$ |

TABLE 3-continued
COMPARISON OF PRESSURE SENSITIVE RESINS

| Interpolymer | % Crosslinker | Ball Tack 11.1 mm ball cm. | Ball Tack 6.35 mm ball cm. | Peel Strength, 10 Min. Ncm$^{-1}$ | Peel Strength, 24 Hrs. Ncm$^{-1}$ | Creep Resistance 454 g load, 1.61 cm$^2$ Hrs. |
|---|---|---|---|---|---|---|
| | 0.1 PBT | 6.78 | 3.23 | 4.28$^a$ | 9.08$^a$ 16.42$^c$ | 0.38$^c$ |
| | 0.2 PBT | 7.75 | 3.25 | 5.05$^a$ | 7.86$^a$ 15.76$^c$ | 1.05$^c$ |
| | 0.4 PBT | 8.81 | 4.50 | 3.84$^a$ | 7.68$^a$ | 69.8$^c$ |
| | 0.1 TAA | 5.79 | 3.30 | 5.24$^a$ | 7.86$^a$ | 0.35$^c$ |
| | 0.2 TAA | 7.54 | 3.30 | 4.59$^a$ | 7.52$^a$ | 1.02$^c$ |
| | 0.4 TAA | 11.35 | 6.40 | 4.02$^a$ | 6.46$^a$ | 30.2$^c$ |
| | 0.1 TBT | 6.17 | 2.68 | 4.68$^a$ | 0.65$^a$ 16.81$^c$ | 0.29$^c$ |
| | 0.2 TBT | 5.92 | 3.05 | 4.37$^a$ | 7.68$^a$ | 0.55$^c$ |
| | 0.4 TBT | 13.16 | 6.10 | 3.41$^a$ | 5.99$^a$ | 13.7$^c$ |
| Example 5 | Control - 0 | 7.92 | 3.61 | 4.28$^a$ | 5.77$^a$ | 0.72$^c$ |
| | 0.1 PBT | 16.5 | 4.83 | 3.84$^a$ | 5.59$^a$ | 14.8$^c$ |
| | 0.1 TAA | 8.26 | 3.63 | 4.24$^a$ | 5.55$^a$ | 8.1$^c$ |
| | 0.1 TBT | 7.92 | 3.61 | 4.28$^a$ | 5.77$^a$ | 5.7$^c$ |
| Example 6 | Control - 0 | — | >25 | 3.28*$^a$ | 6.99$^a$ | 1.0$^c$ |
| | 0.2 PBT | — | 18.0 | 4.35*$^a$ | 6.39$^a$ | >190 |
| | 0.4 PBT | — | >25 | 3.81*$^a$ | 6.08$^a$ | >190 |
| | 0.2 TAA | — | 23.1 | 3.68*$^a$ | 6.54$^a$ | 20.4$^c$ |
| | 0.4 TAA | — | 23.6 | 2.82*$^a$ | 5.82$^a$ | 26.8$^c$ |
| | 0.2 TBT | — | >25 | 4.23*$^a$ | 6.17$^a$ | 16.8$^c$ |
| | 0.4 TBT | — | >25 | 3.95$^a$ | 5.97$^a$ | 147$^c$ |

$^a$adhesive failure
$^c$cohesive failure
*20 minute bond time

The data show that the cohesive strength of the pressure sensitive resins as demonstrated by the creep strength is improved by a much greater amount when poly(butoxytitanoxane) is used as the crosslinking agent. Thus, the creep strength for the examples at 0.4 parts of crosslinking agent per 100 parts of interpolymer is increased by 81 times, 349 times, 21 times and >190 times respectively when PBT is the crosslinking agent while the respective increases for TAA are 33 times, 151 times, 11 times and 27 times and for TBT are 51 times, 69 times, 8 times and 147 times. The greater then creep strength for PBT compositions in comparison with compositions containing TBT is truly surprising since the efficiency of crosslinking would be expected to be greater for the monomeric TBT since it should be more uniformly distributed throughout the resin mass. The data also show that there is little decrease in tack or peel strength with PBT although the higher cohesive strength would suggest the contrary since a tighter network of crosslinks should cause a decrease in tack and adhesion.

Film color of dry film of the pressure sensitive resin compositions is compared by the following test. The pressure sensitive resin solution is coated onto polyethylene terephthalate film (25 micron in thickness) and is dried at 90° C. for 2 minutes to provide a film of adhesive of 25 micron thickness. The film is rolled up to provide a block containing 200 layers of film. The color of the block is observed. When this test is carried out with the resin of Example 2, the following results are obtained.

| Resin | Color |
|---|---|
| Example 2 | no significant color |
| Example 2, 0.4% PBT | no significant color |
| Example 2, 0.4% TBT | unacceptable yellow color |
| Example 2, 0.4% TAA | unacceptable deep yellow color |

What is claimed is:

1. An article coated with a pressure sensitive resin composition comprising:
   A. an interpolymer having a weight average molecular weight in the range of about 10,000 to about 500,000 and a glass transition temperature in the range of about −15° C. to about −75° C., the interpolymer comprising:
      a. from about 0.5 to about 20 weight percent of at least one monomer containing a hydroxyl or carboxyl group, and
      b. at least one acrylic ester containing from six to 20 carbon atoms; and
   B. at least one polymetaloxane having the formula $(M_nO_{n-1})(OR)_{2n+2}$ wherein M is titanium or zirconium, n is an integer of from 2 to 20 and R is selected from the group consisting of aliphatic, substituted aliphatic, alicyclic and substituted alicyclic radicals containing from 2 to 10 carbon atoms and wherein the polymetaloxane is present in an amount sufficient to improve the cohesive strength of the dry pressure sensitive resin composition.

2. The article of claim 1 wherein the interpolymer comprises also one or more ethylenically unsaturated monomers selected from the group consisting of α-olefins containing from two to 10 carbon atoms, vinyl esters of alkanoic acids containing from three to 10 carbon atoms, ethyl, methyl and propyl acrylates, methacrylates containing from 3 to 20 carbon atoms, acrylonitrile, methacrylonitrile, styrene, α-methyl styrene, vinyl chloride and diesters of unsaturated dicarboxylic acids such as maleic acid, fumaric acid, and itaconic acid containing from 6 to 20 carbon atoms.

3. The article of claim 1 wherein the acrylic ester has an average of from 6 to 12 carbon atoms.

4. The article of claim 1 wherein the acrylic ester is an ester of a branched chain aliphatic alcohol.

5. The article of claim 1 wherein the hydroxyl or carboxyl containing monomer is in the range of about 1 to about 10 weight percent of the interpolymer.

6. The article of claim 1 wherein the polymetaloxane is present in an amount in the range of about 0.01 to about 2 parts by weight per 100 parts by weight of interpolymer.

7. The article of claim 1 wherein the polymetaloxane is present in an amount in the range of about 0.05 to about 1 part by weight per 100 parts by weight of interpolymer.

8. The article of claim 1 wherein the polymetaloxane is a polytitanoxane containing on average from 3 to 10 atoms of titanium per molecule and R is a linear aliphatic radical containing on average from 3 to 6 carbon atoms.

9. The coated article of claim 1, 2, 5, 6, 7 or 8 wherein the article is a transparent plastic film of polyethylene or polyester.

10. A process of preparation of a pressure sensitive adhesive coated article which comprises applying a film of a pressure sensitive resin composition to the article, wherein the pressure sensitive composition comprises:
   A. an interpolymer having a weight average molecular weight in the range of about 10,000 to about 500,000 and a glass transition temperature in the range of about $-15°$ C. to about $-75°$ C., the interpolymer comprising:
      a. from about 0.5 to about 20 weight percent of at least one monomer containing a hydroxyl or carboxyl group, and
      b. at least one acrylic ester containing from six to 20 carbon atoms; and
   B. at least one polymetaloxane having the formula $(M_nO_{n-1})(OR)_{2n+2}$ wherein M is titanium or zirconium, n is an integer of from 2 to 20 and R is selected from the group consisting of aliphatic, substituted aliphatic, alicyclic and substituted alicyclic radicals containing from 2 to 10 carbon atoms and wherein the polymetaloxane is present in an amount sufficient to improve the cohesive strength of the dry pressure sensitive resin composition.

11. The process of claim 10 wherein the interpolymer comprises also one or more ethylenically unsaturated monomers selected from the group consisting of $\alpha$-olefins containing from two to 10 carbon atoms, vinyl esters of alkanoic acids containing from three to 10 carbon atoms, ethyl, methyl and propyl acrylates, methacrylates containing from 3 to 20 carbon atoms, acrylonitrile, methacrylonitrile, styrene, $\alpha$-methyl styrene, vinyl chloride and diesters of unsaturated dicarboxylic acids such as maleic acid, fumaric acid, and itaconic acid containing from 6 to 20 carbon atoms.

12. The process of claim 10 wherein the acrylic ester has an average of from 6 to 12 carbon atoms.

13. The process of claim 10 wherein the acrylic ester is an ester of a branched chain aliphatic alcohol.

14. The process of claim 10 wherein the hydroxyl or carboxyl containing monomer is in the range of about 1 to about 10 weight percent of the interpolymer.

15. The process of claim 10 wherein the polymetaloxane is present in an amount in the range of about 0.01 to about 2 parts by weight per 100 parts by weight of interpolymer.

16. The process of claim 10 wherein the polymetaloxane is present in an amount in the range of about 0.05 to about 1 part by weight per 100 parts by weight of interpolymer.

17. The process of claim 10 wherein the polymetaloxane is a polytitanoxane containing on average from 3 to 10 atoms of titanium per molecule and R is a linear aliphatic radical containing on average from 3 to 6 carbon atoms.

* * * * *